United States Patent
Saiki et al.

[19]

[11] Patent Number: 6,120,257

[45] Date of Patent: Sep. 19, 2000

[54] POWER TRANSMISSION APPARATUS

[75] Inventors: Manabu Saiki, Chiryu; Junichi Ohguchi, Toyoake; Hiroyasu Sakamoto, Kariya; Yuuichi Aoki, Chita-gun; Takashi Honda, Kariya; Mikio Matsuda, Nishio; Toshitada Nagasawa, Kariya; Youichi Murakami, Ama-gun, all of Japan

[73] Assignees: Denso Corporation, Kariya; Nippon Soken, Inc., Nihsio, both of Japan

[21] Appl. No.: 09/042,028

[22] Filed: Mar. 13, 1998

[30] Foreign Application Priority Data

Mar. 13, 1997 [JP] Japan .................................. 9-059271
Feb. 19, 1998 [JP] Japan .................................. 10-042305

[51] Int. Cl.$^7$ ...................................................... F04B 49/00
[52] U.S. Cl. .............................. 417/223; 192/12 R; 74/11
[58] Field of Search .............................. 417/223; 74/11, 74/15.6, 63; 192/12 R, 54.1, 54.2, 55.1, 55.3, 56.1, 56.5, 66.2, 66.21, 66.22, 66.3, 69.4, 70.11, 70.14, 70.15, 70.16, 70.77, 210–210.1

[56] References Cited

U.S. PATENT DOCUMENTS

| | | | |
|---|---|---|---|
| 4,776,442 | 10/1988 | Young | 192/56 R |
| 4,924,988 | 5/1990 | Page | 192/70.23 |
| 5,180,042 | 1/1993 | Ogiso | 192/56 R |
| 5,415,256 | 5/1995 | Weigand et al. | 192/13 R |
| 5,683,299 | 11/1997 | Kishibuchi et al. | 464/88 |
| 5,700,196 | 12/1997 | Banemann et al. | 464/36 |

FOREIGN PATENT DOCUMENTS 8-159028  6/1996  Japan .
8-210250  8/1996  Japan .

*Primary Examiner*—Mark Paschall
*Assistant Examiner*—Thor Campbell
*Attorney, Agent, or Firm*—Pillsbury Madison & Sutro LLP

[57] ABSTRACT

A power transmission apparatus which can function as a torque limiter during an overload condition. A Belleville spring is provided for generating mutual frictional engagement in areas between a flange part integral to an inner holder member, a washer, arc shaped projections of a flange part of a hub and a washer. As a result, during a normal condition of a compressor, the rotating movement of the inner holder member located adjacent to the rotating movement source is transmitted via the frictional engagement mechanism to a hub and then to a rotating shaft. Contrary to this, during an overloaded condition, a slippage is generated in the area between the washer and the arc shaped projections of the flange part of the hub as a frictional engaging area of a lower coefficient of friction. This slippage causes the washer to sink into the recess of the hub, which causes the washer to be displaced in the direction of the axis of the rotating shaft, which causes the pressing force to be reduced in the Belleville spring, resulting in a free rotating movement of the flange part.

8 Claims, 9 Drawing Sheets

POWER TRANSMISSION APPARATUS

BACKGROUND OF THE INVENTION

1. Field of the Invention

The present invention relates to a power transmission apparatus provided which acts as a torque limiter during an over-load condition and is suitably applied to a power transmission apparatus for operating a compressor located in a refrigerating system for an air conditioning system of an automobile.

2. Background of the Invention

In a refrigerating system for an air conditioning system of an automobile, it common that a compressor of a variable displacement type is used, wherein the capacity of the compressor can be varied even to a value which is nearly zero. In such an air conditioning system, the compressor can be continuously operated while the capacity is varied, i.e., an ON-OFF operation of the compressor is unnecessary, which allows elimination of a clutch device, which must otherwise be arranged between the crankshaft of an internal combustion engine and the compressor.

On the other hand, in the operation of the compressor, lockup can be generated due to overheating, which causes a belt to be subjected to slippage in the transmission system of the compressor, which may cause the belt to be damaged. Furthermore, it is usual for the belt for operating the compressor to be used for operating various supplementary devices of the internal combustion engine such as a battery charger/generator, a recirculating pump for an engine cooling water, and a oil pump for a power steering device and the like. Thus, damage to the belt may possibly cause the automobile to be immobilized.

Thus, provision of a torque limiter, wherein a power transmission train from a drive source to a compressor is disconnected when a transmission torque is increased to a value larger than a predetermined value during an over-load condition of a clutch as caused by an occurrence of a locking, has heretofore been proposed. See, for example, Japanese Unexamined Patent Publications No. 8-159028 and No. 8-210250.

In these prior patents, a torque limiter is constructed by a pulley rotated by a driving force of the engine, a base plate connected to the pulley, a driving force receiving member connected to a rotating shaft of the compressor arranged to face the base plate at a desired spacing, torque transmission balls which are rotatably received in recesses formed in the base plate and the driving force receiving member, and a spring means for generating a spring force between the base plate and the driving force receiving member so that the spacing therebetween is reduced.

In a normal operation, a condition is maintained that the rolling balls are held between the recess in the base plate and the driving force receiving members, while a power transmission from the connecting plate connected to the pulley to the driving force receiving member connected to the drive shaft of the compressor occurs by way of the rolling balls, which allows the compressor to be subjected to the compression operation.

An overload in the compressor due to locking causes the transmission torque to be increased to a value larger than a predetermined value, resulting in the rolling balls being detached from recesses in the base plate and the driving force receiving member against the spring force of the resilient means. The rolling ball is, for example, detached from the recess in the connecting plate on the side of the pulley. As a result, the rolling ball is disengaged from the connecting plate on the side of the pulley, which allows the connecting plate to be freely rotated with respect to the ball, thereby causing the compressor to be disconnected from the rotating movement from the source.

In the above mentioned prior art, a structure is employed for obtaining a switching between an engaged condition where the rolling ball is stored in the recess and a released condition where the rolling ball is disengaged from the recess. In other words, in this prior art structure, the rolling ball is an essential element. However, the rolling ball is formed as a spherical shape of a small diameter, which makes its handling difficult, thereby inevitably increasing the number of steps for completing the assembly of the compressor, resulting in an increase in a production cost.

SUMMARY OF THE INVENTION

An object of the present invention is to provide a power transmission apparatus capable of overcoming the above mentioned difficulties in the prior art.

Another object of the present invention is to provide a power transmission apparatus capable of easing the assembly by eliminating a use of a rolling ball, while keeping a desired torque limiting function during an over-load condition.

According to the present invention, a power transmission apparatus is provided for transmitting a rotating movement from a rotating movement source to a receiver for receiving the rotating movement for causing the receiver to effect its designated function, said apparatus comprising:

a first rotating member (drive rotating member) adapted to be connected to said rotating movement source so that said first rotating member is rotated;

a second rotating member (driven rotating member) adapted to be connected to a rotating shaft of said receiver, and;

a frictional engaging unit for obtaining a frictional engagement between the first and second rotating members;

said frictional engaging unit comprising;

a first frictional member (drive friction member) connected to said first rotating member;

a second frictional member (driven friction member) connected to said second rotating member, said first and second frictional members being arranged axially adjacent with each other;

a third frictional member (intermediate friction member) arranged between said first and second frictional members so that said third frictional member is axially displaceable;

a value of the coefficient of a friction at a frictional area between the first and third frictional members being different from a value of the coefficient of a friction at a frictional area between the second and third frictional members, and;

a spring means for generating an axial pressing force between said first, second and third frictional members;

during a normal operation of said receiver unit, a mutual axially frictional engaged condition is obtained at the frictional areas between said first, second and third frictional members, so that the rotating movement of the first rotating member is transmitted to said second rotating member via said the frictional engaging unit;

during an overloaded condition of said receiver unit, a slippage is generated in the frictional area of the smaller value of coefficient of the friction among the frictional areas between said first, second and third frictional members in such a manner that the occurrence of the slippage causes said intermediate frictional member to be axially displaced along the direction of the axis of said rotating shaft;

said axial displacement causing the axial pressing force in said resilient means to be reduced, thereby permitting the first frictional member to be freely rotated.

According to this structure, when an overload is generated in the receiver, the third frictional member is axially moved, which causes the spring force to be reduced in the spring means, which causes the first frictional member to be freely rotated, thereby obtaining a desired torque limiting function. Furthermore, a member such as a rotating ball is not used, which is advantageous in that a number of working steps during an assembling process of the transmission apparatus is eliminated and that a production cost can be reduced.

Preferably, said frictional engaging unit further comprises a fourth frictional member (further driven frictional member) arranged on the side of the first frictional member opposite the third frictional member, so that the frictional engaging unit creates a first frictional engaging path from an axial surface of the first frictional member, via said third frictional member, to said second frictional member and a second frictional engaging path from the opposite axial surface of the first frictional member to said fourth frictional member.

Due to the provision of the first and second frictional engaging path from the first frictional member on the side of the first frictional member adjacent the rotating movement source to a second frictional member on the side of the first frictional member adjacent the receiver, a reduction of the axial pressing force of the spring means in order to keep a desired transmission torque can be obtained when compared with the case where only one frictional engaging path is provided. Thus, a prolonged service life is obtained and a permanent deformation in the spring is less likely.

Preferably, said first engaging member includes a pulley in connection with said rotating movement source for receiving a rotating movement therefrom, a tubular outer holder member fixedly connected to the pulley, a tubular inner holder member which is radially inwardly spaced from the outer holder member and a rubber member arranged between the outer and inner holder members for resiliently connecting the outer and inner holder members.

According to this structure, a elastic deformation of the rubber member between the outer and inner holder members allows a torque variation in the receiver such as a compressor to be absorbed. Furthermore, a first frictional member is integrally connected to the flange part of the inner holder member, which makes the structure to be simplified.

Preferably, said spring means comprise a Belleville spring and a screw means for connecting said Belleville spring to second rotating member.

Preferably, a relationship between a coefficient $\mu_2$ of the friction of said first frictional member with one of surfaces of said third frictional member and a coefficient $\mu_1$ of the friction of said second frictional member with respect to the other surface of the third frictional member is $\mu_2 > \mu_1$, and wherein said second frictional member includes a recess for allowing said third frictional member to be received, and wherein, during an overloaded condition of the receiver, the third frictional member effects a slide movement with respect to the second frictional member, which causes the third frictional member to be moved into said recess of the second frictional member, thereby causing the third frictional member to be axially moved in the direction of the axis of said rotating shaft.

Due to the function that, during an overload condition of the receiver, the third frictional member is received in the recess, which allows the third frictional member to be axially moved in a reliable way, the torque limiting function is allowed to be effectively executed.

According to another aspect of the present invention, a power transmission apparatus is provided for transmitting a rotating movement from a rotating movement source to a receiver for receiving the rotating movement for causing the receiver to effect its designated function, said apparatus comprising:

a tubular outer holder member adapted to be connected to said rotating movement source so that said first rotating member is rotated;

a tubular inner holder member arranged inwardly of and spaced from said outer holder member;

a rubber member arranged between said inner and outer tubular members and adhered thereto so that the inner and outer tubular members are resiliently connected with each other;

a first frictional member (drive frictional member) as a radially inwardly extending flange portion of said inner holder member;

a rotating member adapted to be connected to said receiver for transmission of the rotating member to the receiver;

a second frictional member (driven frictional member) as a part of said rotating member;

said first and second frictional member being arranged axially adjacent with each other, and;

a spring means for generating an axial pressing force between said first and second frictional members;

during a normal operation of said receiver unit, a mutual axially frictional engaged condition being obtained between said first and second frictional members, so that the rotating movement of the outer holder member is transmitted, via said rubber member, the inner holder member, said first frictional member and said second frictional member, to said rotating member;

during an overloaded condition of said receiver unit, a slippage of said first frictional member being generated with respect to said second frictional member, so that the occurrence of a slippage at the frictional surface generates a temperature increase, thereby destroying a adhesive connection between the inner holder member and the rubber member.

According to this invention, in an overload condition, a slippage of the first frictional member occurs, which causes the adhesive connection of the rubber member to be broken, thereby generating a torque limiting function in a effective manner. In this case, the adhesive connection of the rubber member occurs at the inner surface of the rubber member with respect to the inner holder member. Due to the fact that the area at the inner adhesive connection surface is smaller than that at the outer connecting surface, an increased shearing force per unit of area in the rubber member is obtained at the inner surface over that at the outer surface, so that a reduction is obtained in a torque for causing the transmission power to be disconnected during an overloaded condition.

Preferably, said receiver is a compressor in a refrigerating system for an air conditioning system of an automobile.

BRIEF EXPLANATION OF ATTACHED DRAWINGS

DESCRIPTION OF PREFERRED EMBODIMENT

First Embodiment

Figure 1:
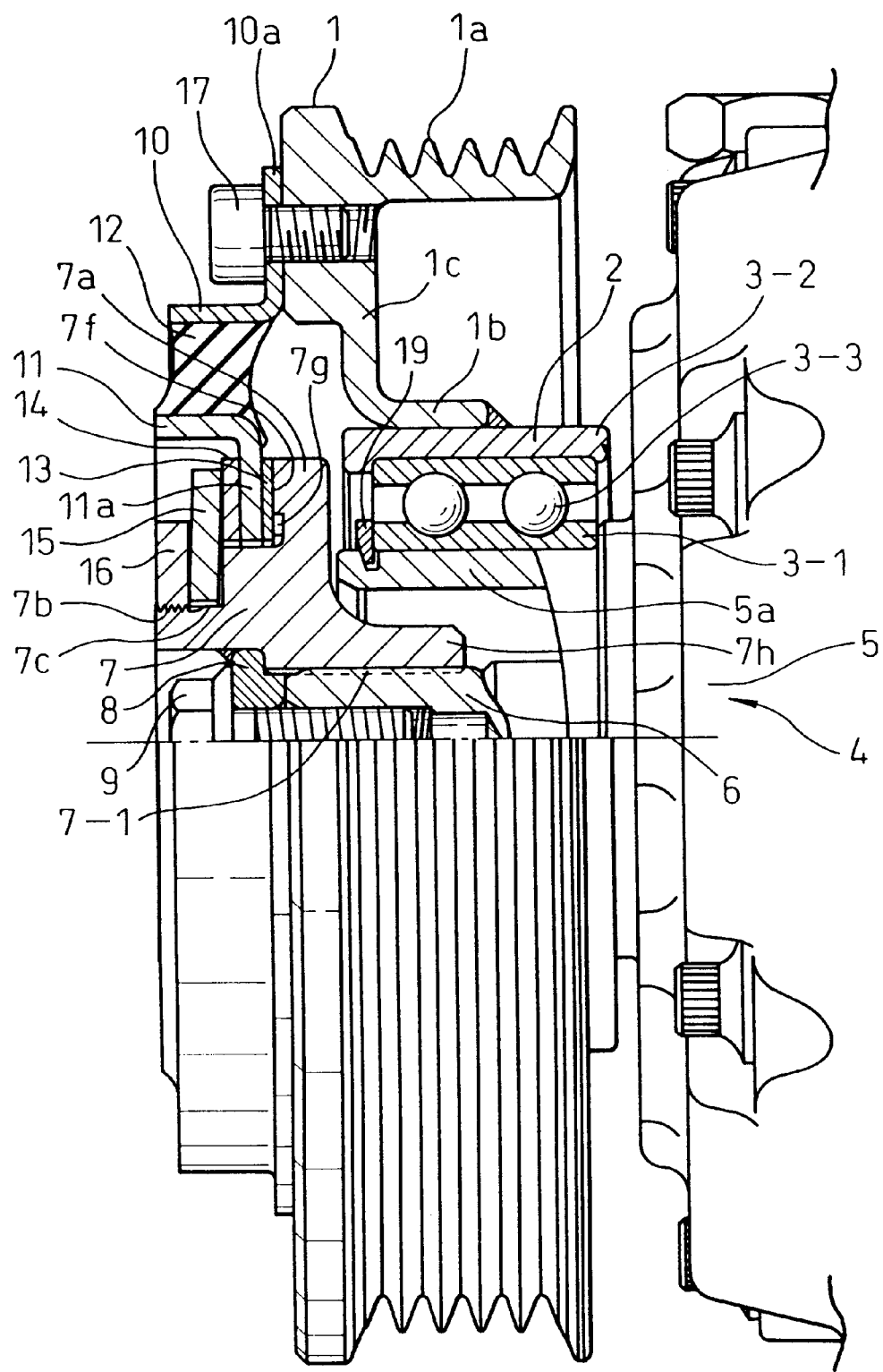
FIG. 1 is view of a transmission apparatus during its normal operating condition, which is, at its bottom half, shown by a side elevational view and is, at its top half, shown by a cross sectional view.
Figure 2:
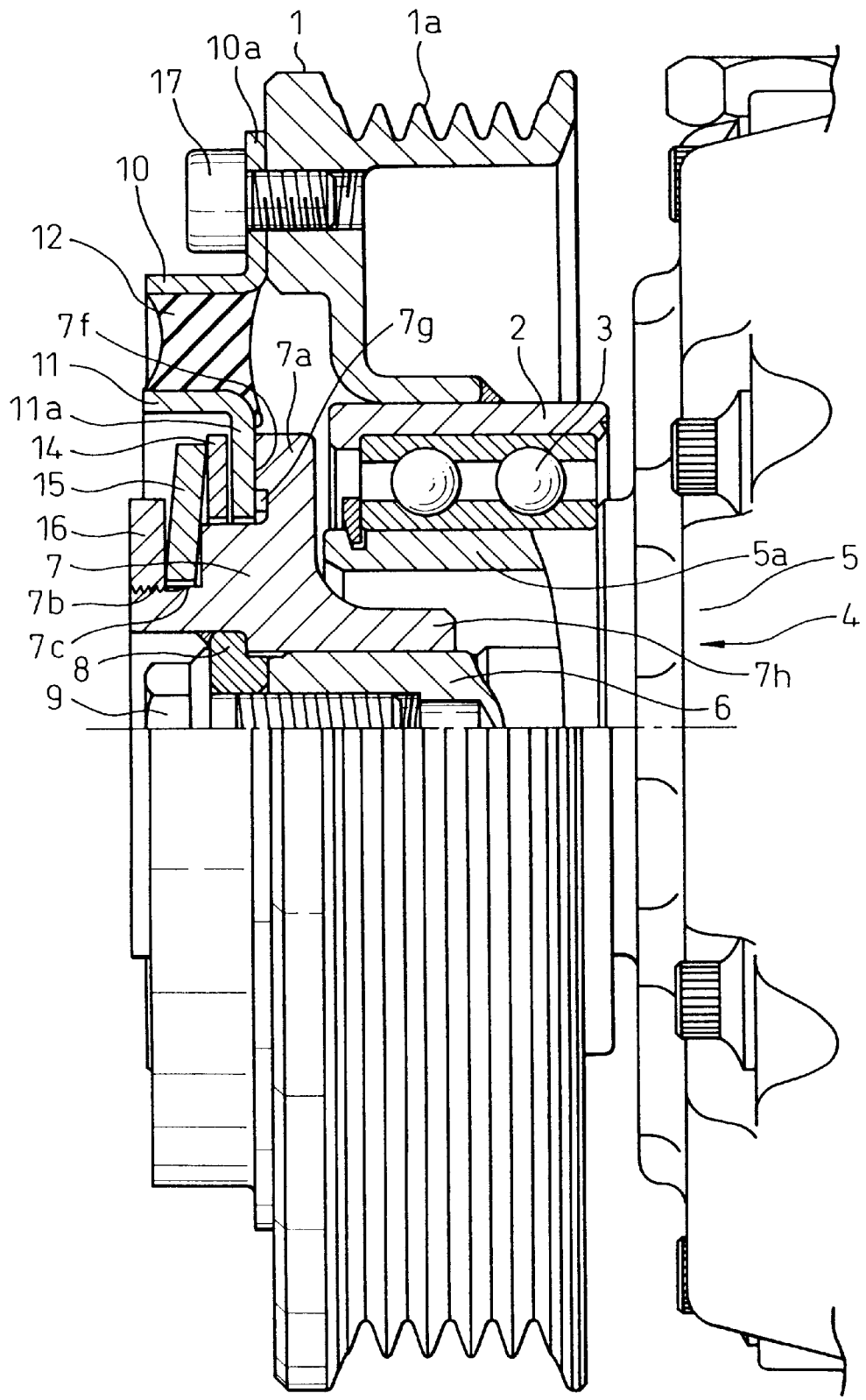
FIG. 2 is similar to FIG. 1 but illustrates the device being subjected to an overloading.

Now, a first embodiment, which is an application of the present invention to a power transmission apparatus for an compressor for an air conditioning system for a vehicle, will be explained with reference to FIGS. 1 to 4. FIG. 1 shows a condition during a normal condition for executing a power transmission, while FIG. 2 shows a condition where a power transmission is prevented due to the occurrence of an over loading.

The power transmission apparatus is for transmitting a rotating movement of a rotating movement source, such as a crankshaft of an internal combustion engine to a compressor 4 in a refrigerating system for an air conditioning system of a vehicle. In the compressor 4, a reference numeral 6 is a rotating shaft for rotating a rotor (not shown) for causing the refrigerant to be compressed and 5 a front housing 5 for rotatably supporting the rotating shaft 6. The front housing 5 is formed with a boss portion 5a.

FIG. 1 shows that the power transmission apparatus is in a normal power transmission condition. In the power transmission apparatus, a reference numeral 1 denotes a drive pulley, which is connected to a rotating movement source, such as a crankshaft of an internal combustion engine in a vehicle. The drive pulley 1 is made of an iron based material and is constructed by a pulley part 1a having a plurality of a V cross-sectional shaped grooves with which belts of a V cross-section are engaged, an inner supporting portion 1b and a disk shaped portion 1c which integrally connects the sections 1a and 1b with each other. The inner tubular supporting portion 1b of the pulley 1 is fixedly located on a tubular rotor member 2. A bearing unit 3 is arranged inside the rotor member 2 for allowing the pulley 1 to be freely rotated on the front housing 5 of the compressor. Namely, the bearing unit 3 is constructed by an inner race 3-1, an outer race 3-2 and two rows of equiangularly spaced balls 3—3 arranged between the inner and outer races 3-1 and 3-2. The outer race 3-1 is fixedly connected to the rotor member 2 by a suitable means such as a welding. The inner race 3-1 is connected to the boss portion 5a of the front housing of the compressor 4.

The power transmission apparatus further includes a hub 7 as a driven rotating member which is made of a steel based material. The hub 7 is made of a steel based material and is formed as a circular cylindrical shape provided with a flange 7a. The hub 7 is connected to the rotating shaft 6 by using means, such as a spline engaging means 7-1, for causing the hub 7 to be rotated together with the shaft 6 while allowing relative axial sliding movement between the hub 7 and the shaft 6. A stopper plate 8 of a ring shape is fixedly connected to the hub 7 by means of welding. A bolt 9 is inserted to the stopper plate 8 and is screwed to a central hole at the end of the rotating shaft 8, so that the hub 7 is fixedly connected to the shaft 6. In other words, the stopper plate 8 functions as a means for axially positioning the hub with respect to the rotating shaft 6.

The hub 7 is, at its axial end remote from the compressor, formed with a circular cylindrical part 7c having a male thread portion 7b. Furthermore, the hub 7 is, at an intermediate location axially inwardly of the tubular portion 7c, formed with a portion 7d (FIG. 4) of a diameter larger than that of the cylindrical part 7c and provided with diametrically opposite, parallel flat surfaces. Adjacent the portion 7d, the hub 7 forms a circular cylindrical part 7e having a diameter which is the same as that of the portion 7d. Finally, adjacent the circular cylindrical part 7e, the hub 7 forms a flange portion 7a as the maximum diameter portion.

Figure 4:
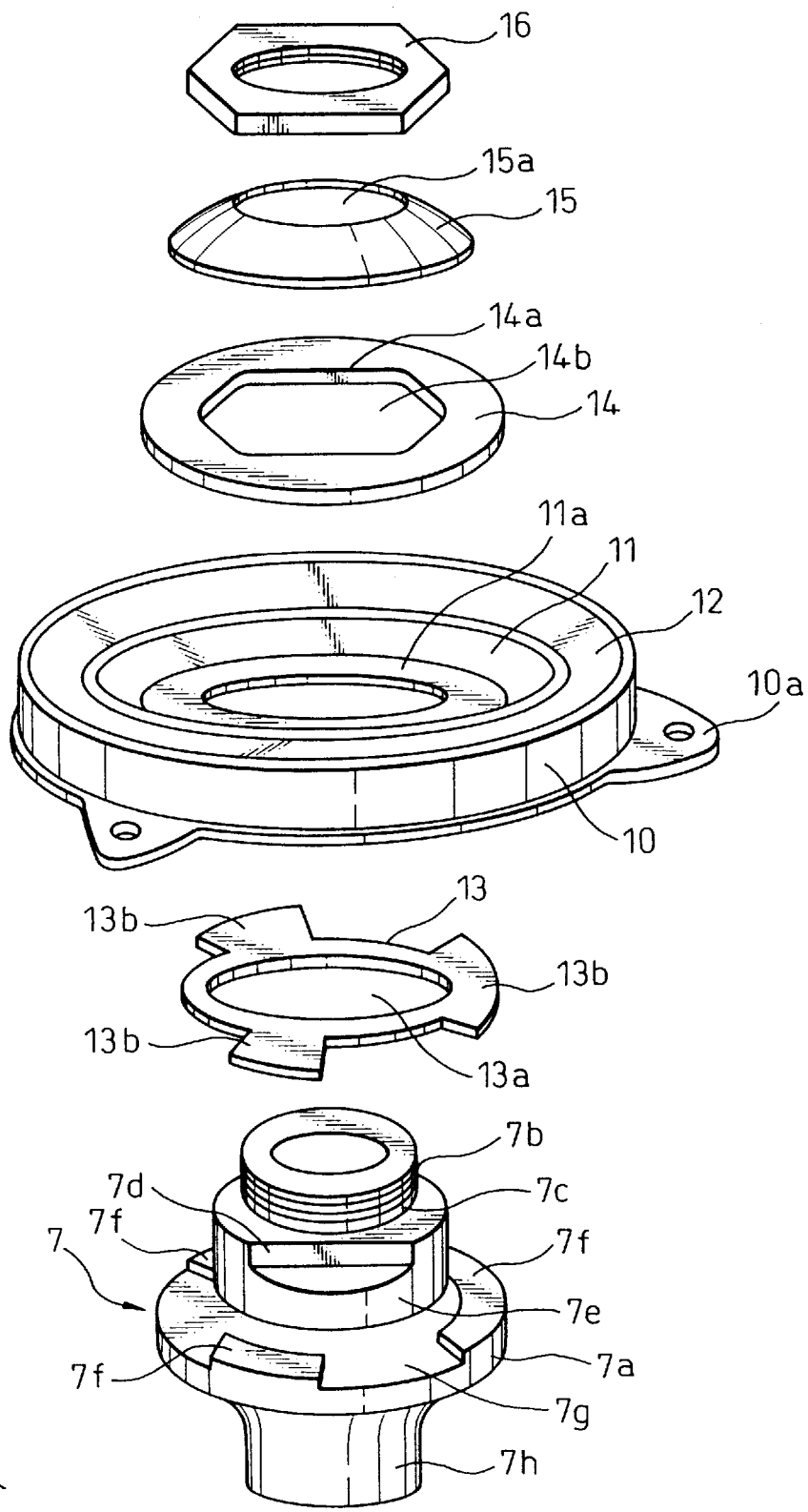
FIG. 4 is a dismantled perspective view of important parts in the first embodiment in FIG. 1.

As shown in FIG. 4, the flange portion 7a is, at a side adjacent the cylindrical part 7e, along the outer periphery, formed with three equiangularly spaced arc shaped projections 7f. In other words, the flange 7a forms, at locations other than the projections 7f, recesses 7g. On the other hand, the hub 7 forms, at the opposite side adjacent to the compressor, a circular cylindrical part 7h of a reduced diameter, so that an annular gap is formed between an outer surface of the cylindrical part 7h and an inner surface of the boss portion 5a of the housing 5 of the compressor.

Figure 3:
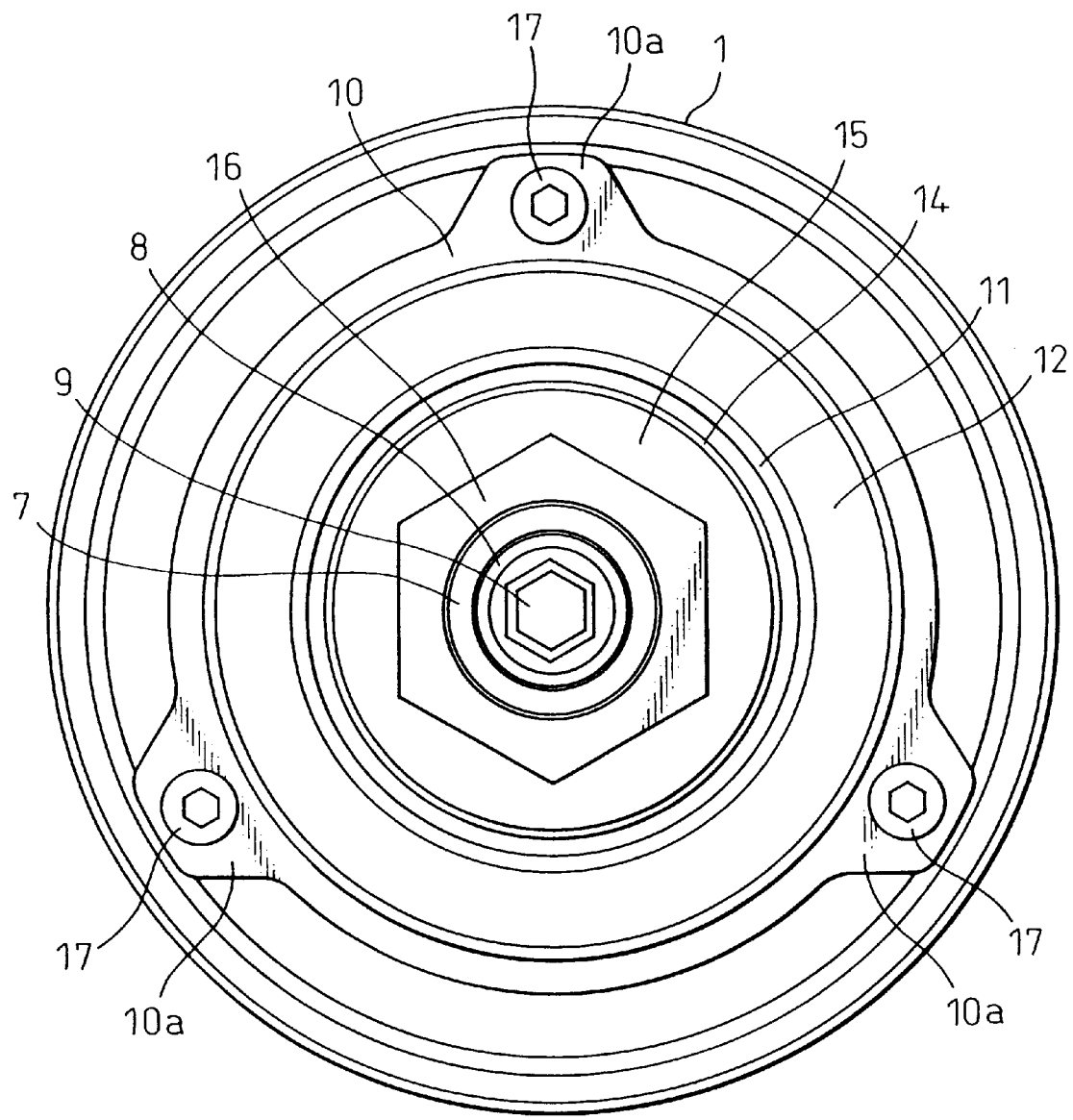
FIG. 3 is a front elevational view of the apparatus in FIG. 1.

In FIG. 1, an outer holder member 10 of a circular cylindrical shape made of a steel based metal material is connected to the rotor 1. As shown in FIGS. 3 and 4, the outer holder member 10 is formed with a plurality (three in the embodiment) equianglulary spaced portions 10a, which extend radially outwardly from the holder member 10. As shown in FIGS. 1 and 3, the projected portions 10a are connected to the disk portion 1c of the pulley 1 by means of connecting means such as bolts 17.

An inner holder member 11 of a tubular shape made of a steel based metal material such as a stainless steel of an increased anti-corrosion characteristic such as SUS 430 or 304 is arranged radially inwardly of the outer holder member 10. The inner holder member 11 is formed with a flange portion 11a, which extends radially inwardly. A rubber member 12 of a sleeve shape is arranged between the outer and inner holder members 10 and 11 and is thermally adhered to their cylindrical surfaces, which faces with each other. As a result, an integral connection between the outer and the inner holder members 10 and 11 via the rubber member 12 is realized, so that the rotating torque of the pulley 1 is transmitted, via the outer holder member 10 and the rubber member 12, to the inner holder member 11. In other words, the pulley 1, the rotor 2, the outer holder member 10, the rubber member 12 and the inner holder member 11 construct a drive rotating member, which are subjected, basically, to an integrated rotating movement.

The rubber member 12 is preferably made of a rubber material providing an increased torque transmission performance while reducing a torque variation in an atmospheric temperature range between −30 to 120° C. for an automobile, such as a chlorinated butyl rubber, acrylonitrile butadiene rubber or ethylene propylene rubber.

The flange part 11a of the inner holding member 11 constructs a drive frictional member and is freely inserted to the cylindrical portion 7e of the hub 7 in such a manner that a gap is left between the inner cylindrical surface of the flange part 11a and the outer cylindrical surface of the cylindrical portion 7e. A washer 13 as an intermediate frictional member is arranged between the flange part 11a of the inner holder member 11 and the flange part 7a of the hub 7 which constructs a first driven frictional member. The arc shaped projections 7f of the flange part 7a are, each, formed with a surface on which a fluorine resin is coated in order to obtain a small value of a frictional coefficient $\mu_1$ at the frictional engaging surface with respect to the washer 13. The fluorine resin coating can, also, provides an electric insulating function, which can prevent the arc shaped projections 7f from being subjected to corrosion.

Furthermore, the washer 13 is made of material having an increased anti-corrosion performance such as a stainless steel such as SUS 430 or 304, or phosphor bronze. Namely, the washer 13 is formed with, at a central part, a circular hole 13a and, at a peripheral part, circumferentially spaced radially outwardly extending three arc shaped engaging parts 13b. The washer 13 is formed with a central hole 13a, to which the cylindrical portion 7e of the hub 17 is freely inserted at a desired radial clearance. Furthermore, the three arc shaped engaging parts 13b at the outer peripheral edge of the washer 13 have dimensions corresponding to the three arc shaped projections 7f, respectively, at the outer peripheral edge of the flange portion 7a of the hub 7.

The washer 13 is connected to the hub 7 in such a manner that the arc shaped projections 13b are under axial face-to-face contact with the arc shaped engaging parts 13b during a normal assembled condition. FIG. 1 shows such a normal assembled condition.

A further washer 14 as a second driven frictional member is arranged at a location on the hub 7 between the flange part 11a of the inner holder member 11 and a Belleville spring 15 as a resilient means. This washer 14 is made of a stainless steel of an increased anti-corrosion performance such as SUS 400 or 304 and is, at its surface, formed with a fluorine coating, so that, on one hand, the frictional coefficient of the washer 14 with respect to the flange part 11a of the inner holder member 11 is reduced and a stable value of the frictional coefficient is obtained, on the other hand. Furthermore, such a fluorine coating can provide an electric insulating function, thereby preventing the washer from being subjected to corrosion.

Furthermore, the washer 14 is, generally, formed with a ring shape as shown in FIG. 4. Namely, the washer 14 is provided with an elongated hole 14b having a pair of diametrically opposite flat faces 14a. To the elongated hole 14b of the washer 14, the portion 7d with the diametrically opposite flat faces is fitted, which allows the washer 14 and the hub 7 to be integrally rotated.

The Belleville spring 15 is made from a metal material, such as a carbon tool steel such as SK5, having a surface subjected to a zinc coating so as to increase an anti corrosion performance. The Belleville spring 15 is, as shown in FIG. 4, formed as a dish shape having a central circular opening 15a, to which the cylindrical portion 7c of the hub 7 is freely inserted at a predetermined clearance. A nut 16 as a screw means is screwed to the male screw thread portion 7b of the hub, so that the spring 15, the washer 14 and the flange portion 11a of the inner holder 11 are tightened between the nut 16 and the flange portion 7a of the hub 7. The nut 16 is made of a material such as a carbon steel such as S35C having an outer surface subjected to a zinc coating treatment in order to increase the anti-corrosion performance.

The tightening force of the nut 16 applies a force to the Belleville spring 15, so that the latter is subjected to a compression in an axial direction, thereby generating a spring force in the spring 15. Under this spring force, the Belleville spring 15 is, at its outer peripheral edge, contacted with the side surface of the flange portion 11a of the inner holder 11.

As explained above, the arc shaped projection 7f of the flange part 7a of the hub 7 is, at its surface, formed with a fluorine resin coating, so as to obtain a friction coefficient $\mu_1$ of a value as small as about 0.1 at an area between the arc shaped projection 7f of the flange part 7a of the hub 7 (second driven friction member) and a side (right handed side of FIGS. 1 and 2) of the washer (intermediate friction member) 13.

On the other hand, the flange part 11a of the inner holder member (drive friction member) 11 is formed with a finely roughened surface by being subjected to a suitable process such as a shot-blasting, so as to obtain a friction coefficient $\mu_2$ of a value as large as about 0.25 at an area between the flange part 11b of the inner holder member 11 and the other side (left handed side) of the washer 13. In other words, a relationship that $\mu_2 > \mu_1$, is obtained.

Furthermore, the washer 14 as a second driven friction member is also provided with, at its surface, a fluorine resin coating, so that a small friction coefficient $\mu_3$ of a value similar to the friction coefficient $\mu_2$ is obtained at an area between the flange part 11a of the inner holder member 11 and the washer 14.

Now, a method for assembling the device in the first embodiment will be explained. First, an assembly constructed by a pulley 1, the rotor 2 and the bearing unit 3 is prepared. Then, the assembly is mounted to the boss portion 5a of the front housing 5 of the compressor by inserting the inner race 3-1 of the berating unit 3 into the boss portion 5a and engaging a snap ring 19 to a circular recess on the outer peripheral surface of the boss portion 5a. Then, the hub 7, to which the stopper plate 8 is connected by means of a welding, is inserted to the rotating shaft 6 of the compressor so that a spline engagement is obtained between the outer spline part of the shaft 6 and the inner spline part of the hub 7. Then, the bolt 9 is, via the stopper plate 8, screwed to the shaft 6, which causes the hub 7 to be tightly connected to the shaft 6.

Then, the washer 13 is, at its circular central hole, freely inserted to the cylindrical part 7e of the hub 7 in such a manner that the arc shaped engaging parts 13b of the washer 13 are in face-to-face axially aligned contact with the corresponding arc shaped projections 7f at the flange part 7a of the hub 7.

Then, an integrated assembly of the outer holder member 10, the circular cylindrical rubber member 12 and the inner holder member 11 is prepared. Then, the assembly is connected to the pulley. Namely, the flange part 11a of the inner holder member 11 is freely inserted into the outer surface of the circular cylindrical part 7e of the hub 7 and, then, the bolts 17 are, via the three respective connecting parts 10, screwed into corresponding screw holes in the pulley 1, so that a integrated connection of the outer holder member 10 to the pulley 1 is obtained.

Then, the washer 14 is inserted to the portion 7d, so that the washer 14 is, at its parallel inner flat faces 14a, engaged with the corresponding flat portions 7d of the hub 7, so that the hub 7 and the washer 14 are connected in the rotating direction.

Then, the Belleville spring 15 is freely inserted to the outer surface of the tubular part 7c of the hub, and, then, the nut 16 is screwed to the male thread part 7b of the hub 7, which causes the spring 15 to be resiliently compressed in an axial direction for a predetermined amount, thereby generating a predetermined spring force. Under this spring force of the Belleville spring 15, the peripheral edge portion of the spring 15 is press contacted with the side surface of the washer 14, thereby obtaining frictional engaging conditions between the washer 14 and the flange portion 11a of the inner holder member 11, between the flange portion 11a of the inner holder member 11 and the washer 13, and between the washer 13 and the flange portion 7a of the hub 7, respectively.

As a result, a completed assembly of the power transmitting device is obtained, which allows the rotating movement of the inner holder member 11 to be transmitted to the hub 7 via a first frictional engagement path from the flange portion 11a of the inner holder member 11 to the flange part 7a of the hub 7 via the washer 13 and via a second frictional engagement path from the flange portion 11a of the inner holder member 11 to the parallel width part 7d of the hub 7 via the washer 14.

In the above assembling process, a setting of the position of the inner holder 11 is such that a preload is generated in the rubber member 12 for urging the inner holder 11 in the direction of the compressor when the outer holder member 10 is integrally connected to the pulley 1 by means of the bolts 17.

Although not illustrated in the detail, the compressor 4 is of a type known as a variable displacement type such as a swash plate type or wobble type, where a stroke of a piston is varied by varying an inclination angle of a swash plate in a piston driving mechanism, so that a output capacity is continuously varied between 0 to 100%.

By using the above mentioned continuous variable displacement type of a compressor, a control of a refrigerating capacity during an execution of a refrigerating cycle is realized by means of a displacement control in the compressor 4, so that a provision of an electro-magnetic clutch, which is otherwise necessary for an on-off control of the electro-magnetic clutch, can be eliminated.

Now, an operation of the first embodiment of the present invention will be explained. During a normal operating condition of the compressor 4, the rotating movement of the rotating shaft 6 of the compressor 4 is transmitted to the pulley 1 via a not shown belt, so that, together with the pulley 1, the rotor 2, the outer holder member 10, the rubber member 12 and the inner holder member 11 are rotated.

Under the spring force of the Belleville spring 15 as generated by a tightening force F by the nut 16, frictionally engaged conditions are obtained at the areas between the washer 14 and the flange portion 11a of the inner holder member 11, between the flange portion 11a of the inner holder member 11 and the washer 13 and between the washer 13 and the flange portion 7a of the hub 7, respectively. As a result, a rotating movement of the inner holder member 11 is transmitted to the hub 7 by way of a first frictional engagement path from the flange portion 11a of the inner holder member 11 to the flange part 7a of the hub 7 via the washer 13 and a second frictional engagement path from the flange portion 11a of the inner holder member 11 to the parallel width part 7d of the hub 7 via the washer 14.

The rotating movement from the hub 7 is transmitted to the rotating shaft 6, which causes the compressor to effect a compression operation.

During the normal operation of the compressor 4, a torque in the rotating shaft 6 is varied, which causes the rubber member 12 to be subjected to an elastic deformation, which allows torque variation to be absorbed. As a result, a vibration in the compressor is reduced, which allows a noise to be reduced at an atmosphere around the compressor. Namely, a transmission torque T during the normal operation of the compressor is expressed by $$T \times n \times \mu \times F \times R \qquad (1)$$

where n is a number of frictional force transmitting paths, which is 2 in case of the above embodiment, since there are two paths, one being located on the side of the washer 13, the other being that is located on the side of the washer 14; $\mu$ is a coefficient of friction at the frictional engagement surface; F is a tightening load of the nut 16, and; R is a radius from the rotating axis of the frictional engaging surface.

In the usual operating condition of an air conditioning system for a vehicle, the maximum value of the driving torque of a compressor is about 2(kgf×m). thus, by setting a transmission torque in the above power transmission apparatus to a value such as 3.5(kgf×m) which is larger than the above mentioned maximum value of the driving torque, a desired torque transmission during the usual or normal operating condition can be executed.

As will be easily understood from the above equation (1), the value of n of 2 by the provision of the two frictional engagement paths can reduce the tightening force F of the nut by half, thereby prolonging a fatigue life of the Belleville spring 15 and preventing the spring 15 from being easily subjected to a permanent deformation.

On the other hand, an occurrence of locking of the compressor 4 causes a torque larger than the above mentioned preset value (3.5(kgf×m)) to be generated at the frictional engaging surfaces. As mentioned above, according to the present invention, in the first friction transmission path, a relationship between the coefficient $\mu_1$ of friction between the washer 13 and the flange portion 7a of the hub 7 and the coefficient $\mu_2$ of friction between the washer 13 and the flange portion 11a of the inner holder member 11 is such that $\mu_2 > \mu_1$. As a result, the excessively large load torque causes, initially, a slippage to be generated at the area between the washer 13 of a smaller value of the coefficient $\mu_1$ of the friction. Then, a slippage is also generated at the area between the flange part 11a of the inner holder member 11 and the washer 14.

When a slippage of the drive side washer 13 of a predetermined degree of an angle of, for example, 50° in a rotating direction occurs with respect to the surface of the driven side flange part 7a of the driven side hub 7, the arc shaped engaging part 13b of the washer 13 is disengaged from the corresponding arc shaped projections 7f of the flange part 7a of the hub 7, which causes the part 13b to be "sink" into the recess 7g on the flange part 7a of the hub 7, so that the washer 13 is, as a whole, on the cylindrical part 7e of the hub 7, moved axially toward the compressor 4. As a result, the flange part 11a of the inner holder member 11 is, also, moved axially toward the compressor 4, so that a condition is obtained that the flange part 11a is in a direct contact with the flange part 7a of the hub 7, as shown in FIG. 2. As a result, the spring 15 is extended axially, which causes the force of the spring 15 to be rapidly reduced. In other words, the transmission torque F transmitted along the above mentioned two paths is rapidly reduced to a value lower than the above mentioned value (2 kgf×m), which prevents the torque from being transmitted to the rotating shaft 6 of the compressor 4.

In a power transmitting operation for transmission of a rotating movement from an internal combustion engine using a pulley and belt mechanism, it is generally believed that a slippage of the belt on the pulley 1 is commenced when a transmission torque is increased to a value around 5 kgf×m. Thus, the above mentioned operation of the present invention where a torque transmission is cut off at the predetermined value of 3.5 kgf×m is effective for preventing a damage to the belt from occurring.

After the occurrence of the "sinking" of the washer 13, the flange part 11a of the inner holder member 11 connected to the pulley 1 freely rotates with respect to both of the flange part 7a of the hub 7 and the washer 14. However, the free rotation of flange part 11a is executed, while the latter, which is held between the flange part 7a and the washer 14, is maintained under a stable state, which prevents any abnormal noise from being generated.

Furthermore, according to the embodiment, an assembled position of the inner holder member 11 is such that, when the outer holder member 10 is integrally tightened to the pulley 1 by means of the bolts 17, a pre-load is generated in the rubber member 12, which urges the inner holder member 11 in a direction toward the compressor 4, i.e., the right-handed direction in FIGS. 1 and 2. As a result, in the situation of an occurrence of the "sinking" of the washer 13, the resilient force of the rubber member 12 causes the inner holder member 11 to be moved toward the compressor 4, which ensures that the above mentioned torque limiting function is effectively executed.

Second Embodiment

Figure 5:
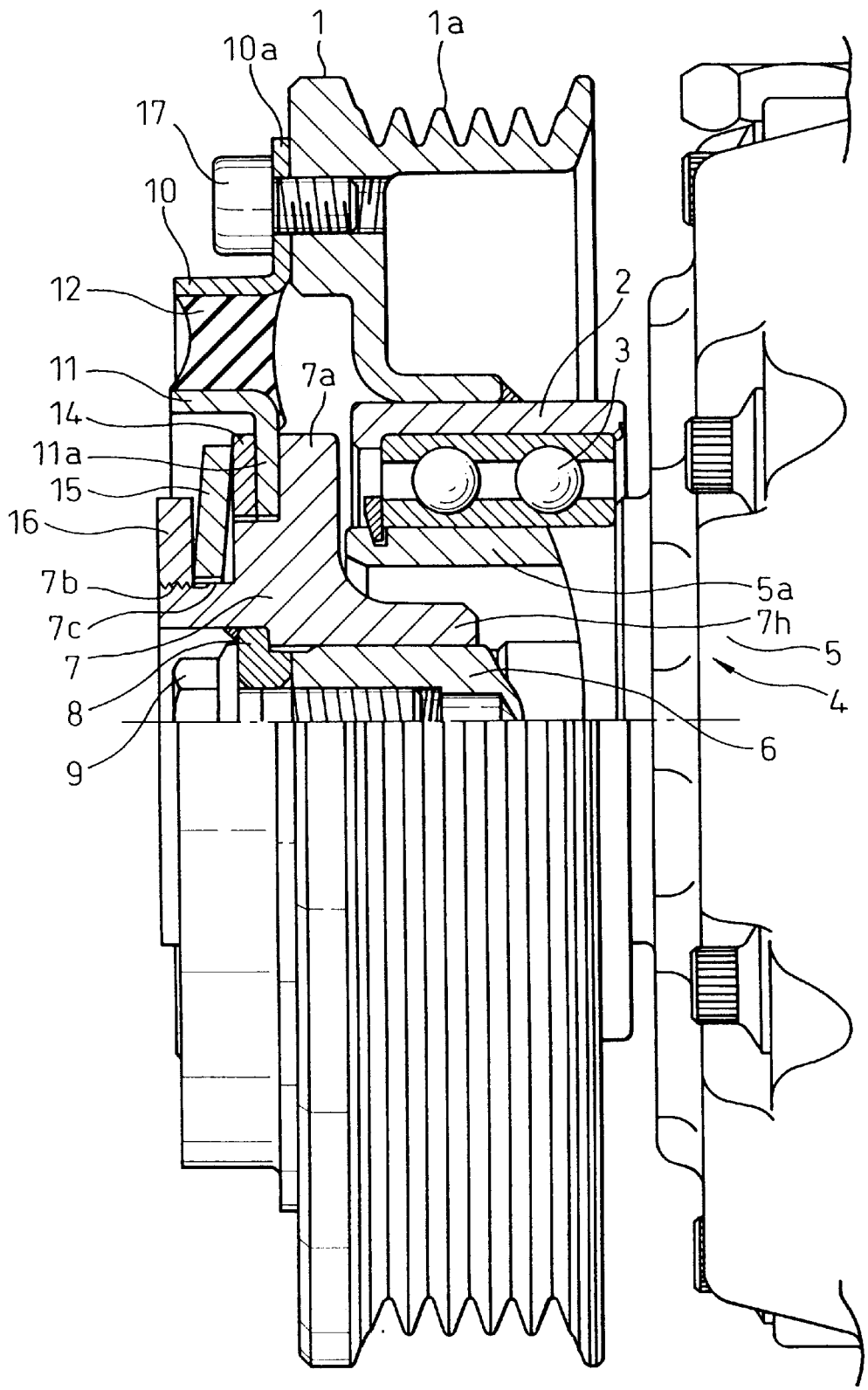
FIG. 5 is similar to FIG. 1 but illustrates a second embodiment.

FIG. 5 shows a second embodiment of the present invention, where the washer 13 in the first embodiment is eliminated and the flange part 11a of the inner holder member 11 is in a direct contact with the flange part 7a of the hub 7.

According to the second embodiment, the "sinking" of the washer 13 does not occur as is the case in the first embodiment. Thus, in the second embodiment, the flange part 11a of the inner holder member 11 effects a sliding movement with respect to both of the flange part 7a of the hub 7 and the washer 14. Such a sliding movement generates a frictional heat, which causes the temperature to be increased, so that a thermally adhered portion between the inner holder member 11 and the rubber member is destroyed, thereby preventing a transmission of torque to the rotating shaft 6 of the compressor.

Third Embodiment

Figure 6:
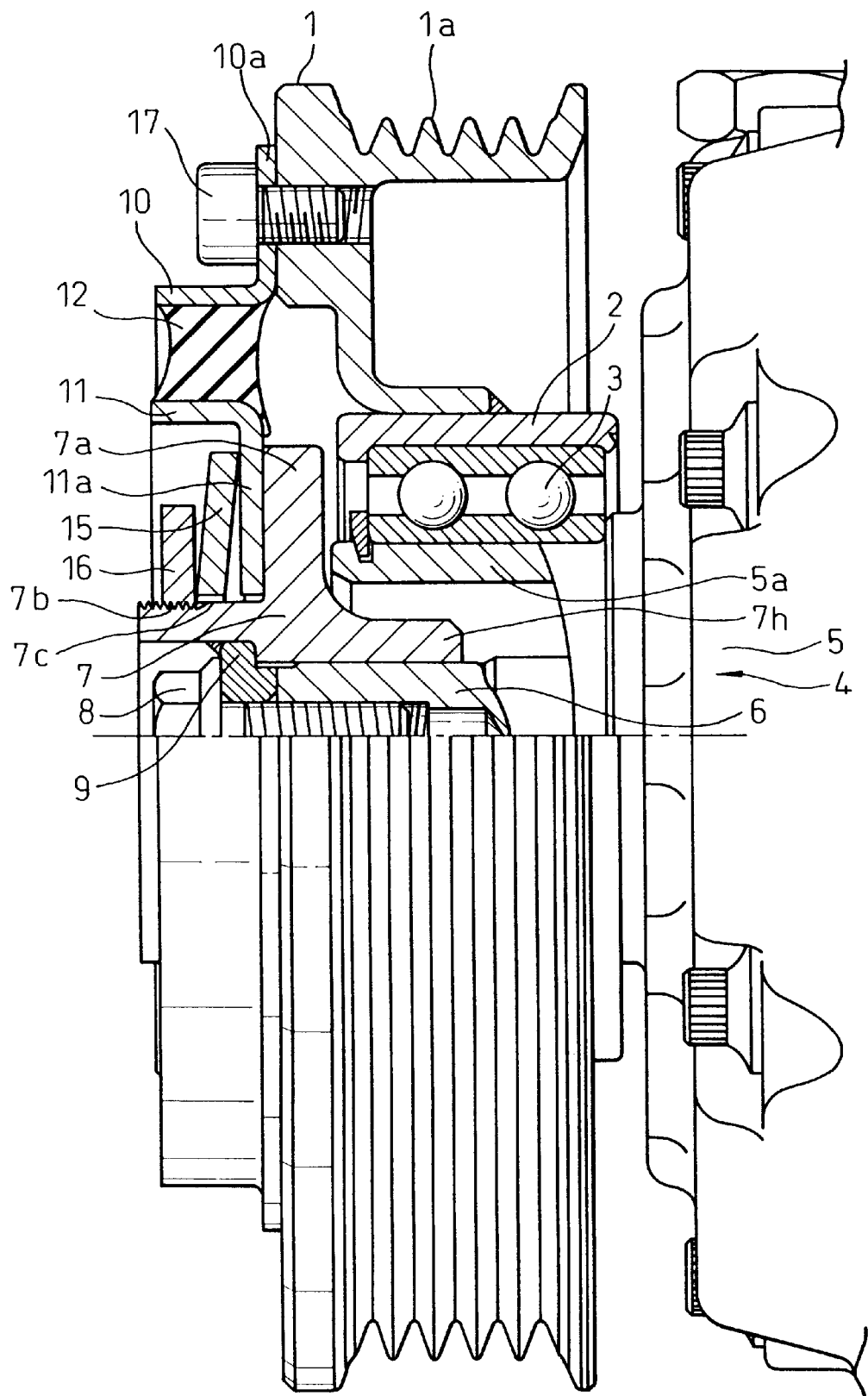
FIG. 6 illustrates a third embodiment.
Figure 7:
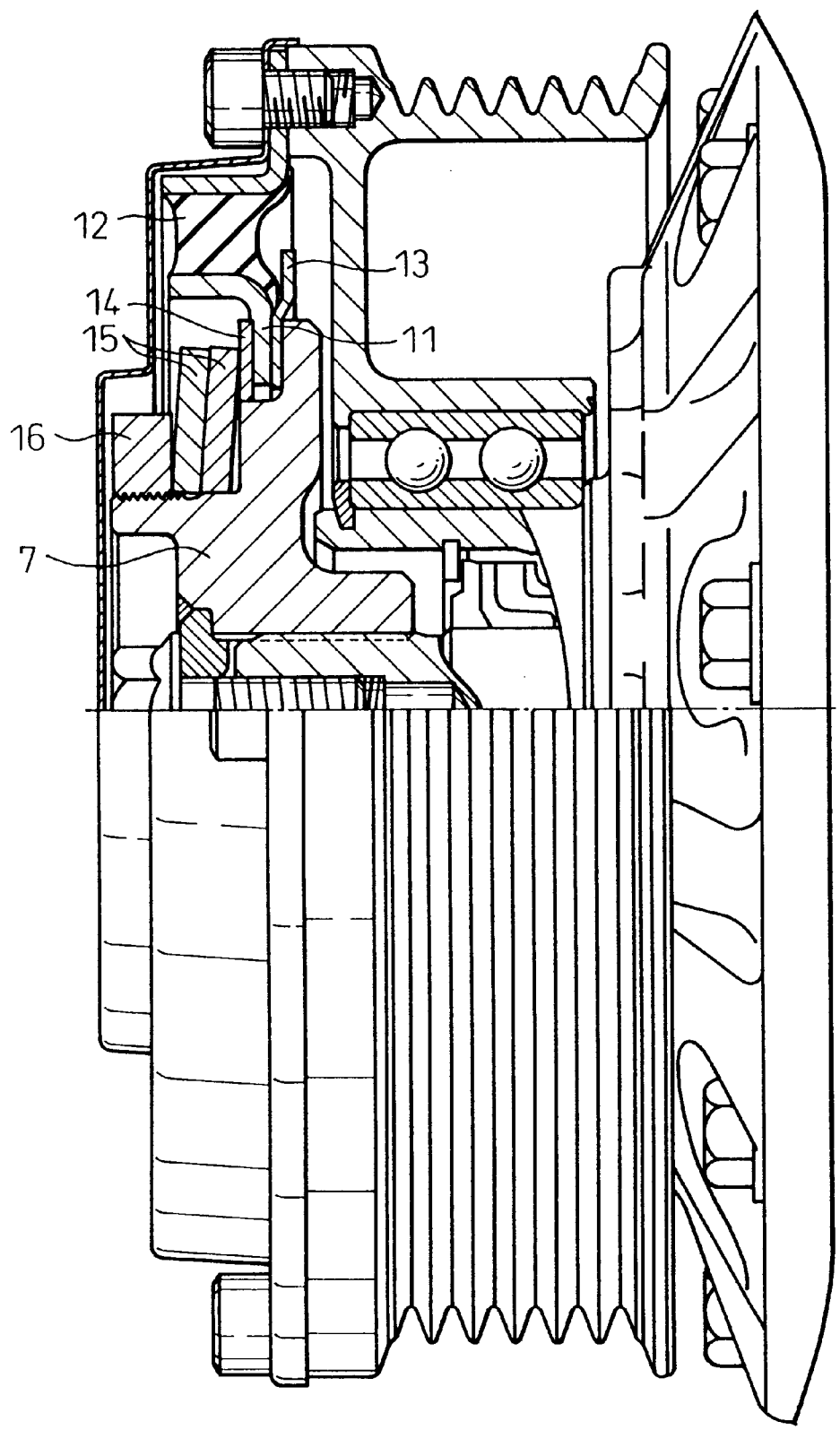
FIG. 7 illustrates another embodiment.
Figure 8:
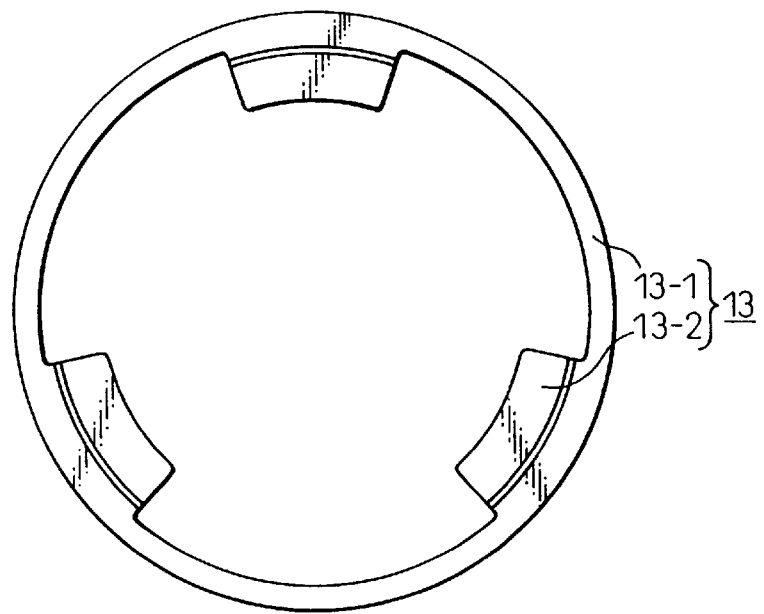
FIG. 8 is a front view of a rear washer in the embodiment in FIG. 7.
Figure 9:
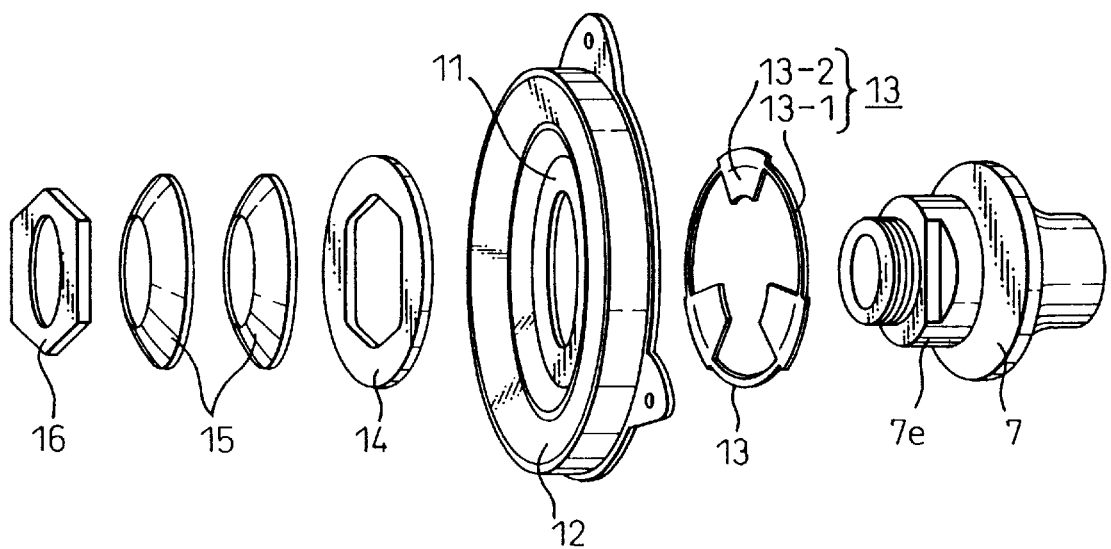
FIG. 9 is a dismantled perspective view of important parts in the embodiment in FIG. 7.

FIG. 6 shows a third embodiment, where both of the washers 13 and 14 in the first embodiment are eliminated and the flange part 11a of the inner holder member 11 is in a direct contact with the flange part 7a of the hub 7 while the Belleville spring 15 is in a direct contact with the flange part 11a of the inner holder member 11. In other words, the spring 15 directly urges the flange part 11a of the holder member 11, so that the flange part 11a is in contact with the flange part 7a. Furthermore, in connection with the elimination of the washer 14, the hub 7 is eliminated in the provision of the parallel flat width portion 7d and the cylinder portion 7e. Thus, the cylinder part 7c of the hub is located at a location which is directly adjacent to the flange part 7a.

In the operation of the third embodiment, when an overload condition is generated, the seized portion of the rubber member 12 is thermally broken, thereby canceling a torque transmission to the rotating shaft of the compressor.

However, in the third embodiment, only one friction path from the flange part 11a of the inner holder member 11 to the flange part 7a of the hub 7 exists. As a result, a load F, by the tightening force of the nut 16, must be twice as much as that in the first or second embodiments.

Fourth Embodiment

Figure 10:
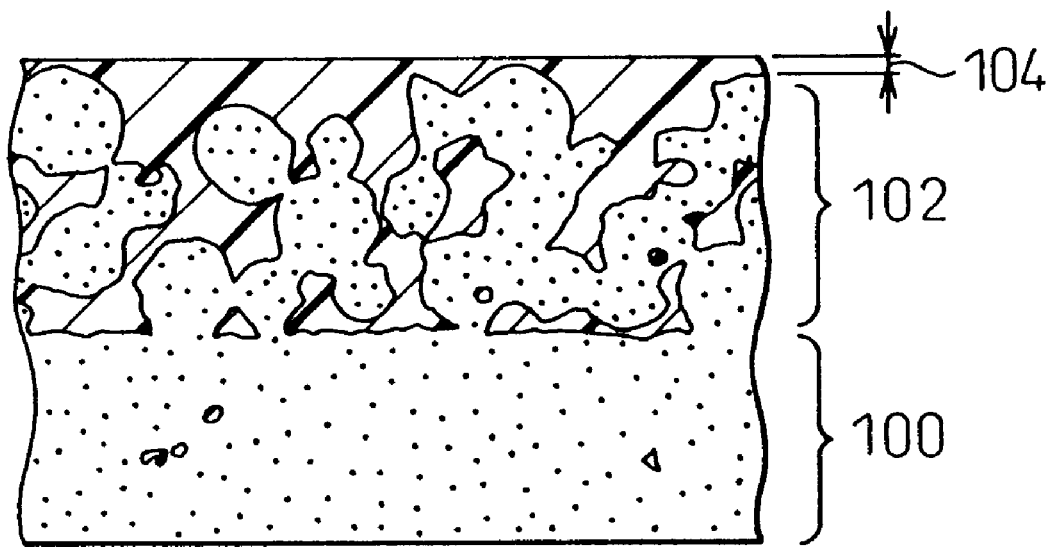
FIG. 10 is a schematic view illustrating a surface coating of the washer.

FIGS. 7 to 10 shows a fourth embodiment, wherein at least the rear washer 13 is made of a core as a sintered or non-sintered phosphor bronze and of a coating of polytetrafluorethylene or $MOS_2$, which is effective for reducing a coefficient of a friction $\mu$. In order to obtain such a low frictional coefficient surface structure, onto a base material, a pulverized phosphor bronze is deposited and sintered, which is followed by impregnation of a polytetrafluorethylene. As a result, a surface structure is obtained as shown in FIG. 10, where a surface layer 104 of made of pure polytetrafluorethylene is located on an intermediate layer 104 as a combination of sintered phosphor bronze and impregnated polytetrafluorethylene on the base part 100. Desirably, the front washer 14 may also be constructed by the similar surface structure as that of the rear washer. As an alternative, the front washer 14 may be made purely of phosphor bronze, which is less likely to be seized with the inner plate 11 made of a material such as SUS.

Furthermore, the rear washer member 13 is formed with a ring portion 13-1 and arc shaped portions 13-2 which are axially displaced and which are fitted to the cylindrical portion 7e of the hub 7. In other words, unlike the previous embodiment where the rear washer is of a complete ring shape, the rear washer 13 is of a "non-continuous" shape, which allows a worn material to be easily exhausted, thereby preventing any seizure from being occurred. In the shown embodiment, the front washer 14 is a continuous ring shape. However, the non-continuous shape can also be applied even to the front washer 14. Finally, in the embodiment, the Belleville springs 15 is doubled in order to increase the axial spring force.

In the operation of this embodiment, the front and rear washers 14 and 13 can keep a condition of a small value of a coefficient of a friction due to the solid coating of small value of a coefficient of a friction due to a provision of surface coating 104 of polytetrafluorethylene or $MOS_2$. During an occurrence of an overloading, the surface solid coating 104 is lost for a short duration of time such as 1 second, although depending a rotating speed, so that an inner layer 102 of phosphor bronze or a combination of phosphor bronze and polytetrafluorethylene is exposed, which allows the rotating movement to continue without occurring any seizure, which finally cause the rubber adhering layer to be thermally broken.

Modifications

In the first embodiment, a setting between the coefficient of friction $\mu_1$ at the frictional engaging area between the washer 13 and the flange part 7a of the hub 7 and the coefficient of friction $\mu_2$ at the frictional engaging area between the flange part 11a of the inner holder member 1 and the washer 13 is such that $\mu_2 > \mu_1$, so that a overloaded condition causes, at first, the washer 13 to slip on the surface of the flange part 7a of the hub 7, which causes the washer 13 to sink into the recess 7g in the flange part 7a of the hub 7. However, the present invention is not limited to such a structure. For example, as opposite to the first embodiment, the relationship between the coefficient of friction $\mu_1$ and coefficient of friction $\mu_1$ is such that $\mu_2 < \mu_1$, and a recess to which the washer is to sink is formed on the flange 11a of the inner holder member 11. Thus, the overloaded condition causes, first, the flange part 11a to be slipped on the washer 13, which, then, causes the washer 13 to sink into the recess on the flange part 11a.

In place of the Belleville spring 15 a coil spring can be used as a spring means for generating a pressing force to the frictional engaging surface including at least the drive frictional member (flange part 11a of the inner holder member 11) and the driven frictional member (flange part 7a of the hub 7) in the direction of an axis of the rotating shaft 6 flange part 7a of the hub 7.

Finally, the present invention should not be necessarily limited to a power transmission apparatus for a compressor in air conditioning system for a vehicle and can be applied to various fields.

What is claimed is:

1. A power transmission apparatus for transmitting a rotating movement from a rotating movement source to a receiver for receiving the rotating movement for causing the receiver to effect its designated function, said apparatus comprising:

a first rotating member adapted to be connected to said rotating movement source so that said first rotating member is rotated;

a second rotating member connected to a rotating shat of said receiver, and;

a frictional engaging unit for obtaining a frictional engagement between the first and second rotating members;

said frictional engaging unit comprising:

a first frictional member connected to said first rotating member;

a second frictional member connected to said second rotating member, said first and second frictional members being arranged axially adjacent with each other;

a third frictional member arranged between said first and second frictional members so that said third frictional member is axially displaceable;

a value of the coefficient of a friction at a frictional area between the first and third frictional members being different from a value of the coefficient of a friction at a frictional area between the second and third frictional members, and;

a spring means for generating an axial pressing force between said first, second and third frictional members, during a normal operation of said receiver unit, a mutual axially frictional engaged condition being obtained at the frictional areas between said first, second and third frictional members, so that the rotating movement of the first rotating member is transmitted to said second rotating member via said the frictional engaging unit;

during an overloaded condition of said receiver unit, a slippage being generated in the frictional area of the smaller value of coefficient of the friction among the frictional areas between said first, second and third frictional members in such a manner that the occurrence of the slippage causes said intermediate frictional member to be axially displaced along the direction of the axis of said rotating shaft;

said axial displacement causing the axial pressing force in said resilient means to be reduced, thereby permitting the first frictional member to be freely rotated, wherein a relationship between a coefficient $\mu_2$ of the friction of said first frictional member with one of surfaces of said third frictional member and a coefficient $\mu_1$ of the friction of said second frictional member with respect to the other surface of the third frictional member is $\mu_2 > \mu_1$, and wherein said second frictional member includes a recess for allowing said third frictional member to be received, and wherein, during an overloaded condition of the receiver, the third frictional member effects a sliding movement with respect to the second frictional member, which causes the third frictional member to be moved into said recess of the second frictional member, thereby causing the third frictional member to be axially moved in the direction of the axis of said rotating shaft.

2. An apparatus according to claim 1, wherein said frictional engaging unit further comprises a fourth frictional member arranged on the side of the first frictional member opposite the third frictional member, so that the frictional engaging unit creates a first frictional engaging path from an axial surface of the first frictional member, via said third frictional member, to said second frictional member and a second frictional engaging path from the opposite axial surface of the first frictional member to said fourth frictional member.

3. An apparatus according to claim 1, wherein said first rotating member includes a pulley in connection with said rotating movement source for receiving a rotating movement therefrom, a tubular outer holder member fixedly connected to the pulley, a tubular inner holder member which is radially inwardly spaced from the outer holder member and a rubber member arranged between the outer and inner holder members for resiliently connecting the outer and inner holder members.

4. An apparatus according to claim 1, wherein said spring means comprise a Belleville spring and a screw means for connecting said Belleville spring to said second rotating member.

5. An apparatus according to claim 1, wherein, among the second and third frictional member, at least the third frictional member has a base part made of a copper based material and a surface coating of a solid lubrication material which prevents a seizure from being generated during an occurrence of an overloaded condition.

6. An apparatus according to claim 1, wherein said receiver is a compressor in a refrigerating system for an air conditioning system of an automobile.

7. An apparatus according to claim 1, wherein said the third frictional member is of a discontinuous form having circumferentially spaced portions in frictional contact with the first and second frictional members.

8. A power transmission apparatus for transmitting a rotating movement from a rotating movement source to a receiver for receiving the rotating movement for causing the receiver to effect its designated function, said apparatus comprising:

a first rotating member adapted to be connected to said rotating movement source so that said first rotating member is rotated;

a second rotating member connected to a rotating shat of said receiver, and;

a frictional engaging unit for obtaining a frictional engagement between the first and second rotating members;

said frictional engaging unit comprising:

a first frictional member connected to said first rotating member;

a second frictional member connected to said second rotating member, said first and second frictional members being arranged axially adjacent with each other;

a third frictional member arranged between said first and second frictional members so that said third frictional member is axially displaceable;

a value of the coefficient of a friction at a frictional area between the first and third frictional members being different from a value of the coefficient of a friction at a frictional area between the second and third frictional members, and;

a spring means for generating an axial pressing force between said first, second and third frictional members, during a normal operation of said receiver unit, a mutual axially frictional engaged condition being obtained at the frictional areas between said first, second and third frictional members, so that the rotating movement of the first rotating member is transmitted to said second rotating member via said the frictional engaging unit;

during an overloaded condition of said receiver unit, a slippage being generated in the frictional area of the smaller value of coefficient of the friction among the frictional areas between said first, second and third frictional members in such a manner that the occurrence of the slippage causes said intermediate frictional member to be axially displaced along the direction of the axis of said rotating shaft;

said axial displacement causing the axial pressing force in said resilient means to be reduced, thereby permitting the first frictional member to be freely rotated, wherein said second frictional member includes a recess for allowing said third frictional member to be received, and wherein, during an overloaded condition of the receiver, the third frictional member effects a sliding movement with respect to the second frictional member, which causes the third frictional member to be moved into said recess of the second frictional member, thereby causing the third frictional member to be axially moved in the direction of the axis of said rotating shaft.

* * * * *

UNITED STATES PATENT AND TRADEMARK OFFICE
CERTIFICATE OF CORRECTION

PATENT NO. :6,120,257
DATED :September 19, 2000
INVENTOR(S) :SAIKI et al.

It is certified that error appears in the above-identified patent and that said Letters Patent is hereby corrected as shown below:

Title page, item

[73] Please change second Assignee's city from "Nihsio" to - - Nishio - -.

[30] Foreign Application Priority Data

Please change "Feb. 19, 1998" to - - Feb. 24, 1998 - -.

Signed and Sealed this

Fifteenth Day of May, 2001

*Attest:*

NICHOLAS P. GODICI

*Attesting Officer*     *Acting Director of the United States Patent and Trademark Office*